United States Patent
Nishikawa et al.

(10) Patent No.: US 10,249,856 B2
(45) Date of Patent: Apr. 2, 2019

(54) ASSEMBLED BATTERY

(71) Applicant: Panasonic Intellectual Property Management Co., Ltd., Osaka (JP)

(72) Inventors: Yukio Nishikawa, Osaka (JP); Tomomi Tanaka, Hyogo (JP); Satoshi Higashida, Hyogo (JP); Tsuneyuki Ejima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/128,929

(22) PCT Filed: Apr. 7, 2015

(86) PCT No.: PCT/JP2015/001940
§ 371 (c)(1),
(2) Date: Sep. 23, 2016

(87) PCT Pub. No.: WO2015/155981
PCT Pub. Date: Oct. 15, 2015

(65) Prior Publication Data
US 2017/0110695 A1 Apr. 20, 2017

(30) Foreign Application Priority Data

Apr. 11, 2014 (JP) ................................. 2014-081658
Feb. 24, 2015 (JP) ................................. 2015-033533

(51) Int. Cl.
*H01M 2/10* (2006.01)
(52) U.S. Cl.
CPC ....... *H01M 2/1077* (2013.01); *H01M 2/1061* (2013.01)

(58) Field of Classification Search
None
See application file for complete search history.

(56) References Cited

U.S. PATENT DOCUMENTS

| 2008/0280194 | A1 | 11/2008 | Okada |
| 2013/0252063 | A1 | 9/2013 | Park |
| 2014/0038030 | A1* | 2/2014 | Goesmann .......... H01M 2/1072 429/157 |

FOREIGN PATENT DOCUMENTS

| JP | 2008-282582 | 11/2008 |
| JP | 2014-010983 | 1/2014 |

OTHER PUBLICATIONS

Fukunaga et al. (a raw machine translation) (Abstract, Detailed Description and Drawings) (Dec. 10, 1999).*

(Continued)

*Primary Examiner* — Carmen V Lyles-Irving
(74) *Attorney, Agent, or Firm* — Panasonic IP Management; Kerry S. Culpepper

(57) ABSTRACT

An assembled battery has a battery block configured by stacking a plurality of single batteries, and fixing components fixing the plurality of the single batteries. The fixing components include a pair of end plates disposed at both ends in a stacked direction of the plurality of the single batteries, and a metal band making the plurality of the single batteries in a compressed state by coupling end parts of the pair of the end plates each other. Each of the pair of the end plates has a peripheral part and a central part. The pair of the end plates respectively contact both end single batteries located at both ends in the stacked direction at the peripheral parts, and are respectively separated from both end single batteries at the central parts.

8 Claims, 8 Drawing Sheets

(56) References Cited

OTHER PUBLICATIONS

The Extended European Search Report dated Jan. 2, 2017 for the related European Patent Application No. 15776867.2.
International Search Report of PCT application No. PCT/JP2015/001940 dated Jul. 14, 2015.

\* cited by examiner

ASSEMBLED BATTERY

CROSS-REFERENCE TO RELATED APPLICATIONS

This application is a U.S. national stage application of the PCT International Application No. PCT/JP2015/001940 filed on Apr. 7, 2015, which claims the benefit of foreign priority of Japanese patent applications 2014-081658 filed on Apr. 11, 2014 and 2015-033533 filed on Feb. 24, 2015, the contents all of which are incorporated herein by reference.

TECHNICAL FIELD

The present invention relates to an assembled battery where a plurality of rectangular batteries are stacked through fixing components.

BACKGROUND ART

In a conventional assembled battery, in order to prevent a decrease of battery performance, for example, a plurality of rectangular batteries are stacked and fixed (for example, refer to Patent Literature 1). FIG. 8 is a view showing a conventional assembled battery described in Patent Literature 1.

This assembled battery has a battery block 23 configured by stacking a plurality of rectangular single batteries 21, and fixing components 24 fixing the plurality of the single batteries 21. The fixing components 24 include a pair of end plates 25 disposed at both end surfaces of the plurality of the single batteries 21, and a metal band 26 fixing the stacked single batteries 21 in a compressed state by coupling end parts of the end plates 25.

CITATION LIST

Patent Literature

Patent Literature 1: Japanese Laid-Open Patent Publication No. 2008-282582.

SUMMARY OF THE INVENTION

The present invention provides an assembled battery where an enlargement of an outer size of the assembled battery is suppressed when the single batteries operate.

An assembled battery of the present invention has a battery block configured by stacking a plurality of single batteries, and fixing components fixing the plurality of the single batteries. The fixing components include a pair of end plates disposed at both ends in a stacked direction of the plurality of the single batteries, and a metal band making the plurality of the single batteries in a compressed state by coupling end parts of the pair of the end plates each other. The pair of the end plates respectively contact both end single batteries located at both ends in the stacked direction at the peripheral parts, and are respectively separated from both end single batteries at the central parts.

By this configuration, even though the single batteries are swollen in its thickness direction when the single batteries operate, the pressure from the plurality of the single batteries can be received by the peripheral part of the end plate. Additionally, since a part of a swell amount of the single battery is absorbed in a portion except the peripheral part of the end plate, the enlargement of the whole outer size of the assembled battery can be suppressed.

DESCRIPTION OF EMBODIMENTS

Figure 8:
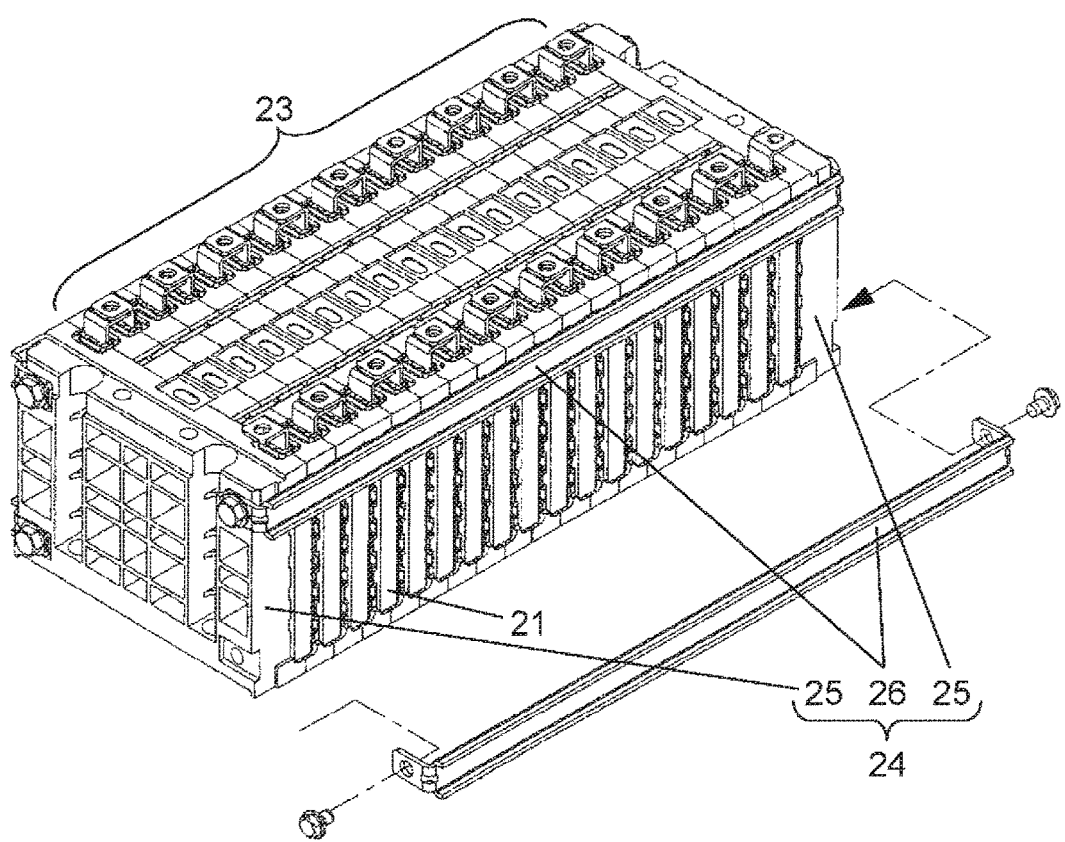
FIG. 8 is a view showing a configuration of a conventional assembled battery.

Problems in a conventional assembled battery are briefly described before an embodiment of the present invention is described. In a configuration shown in FIG. 8, when single batteries operate, a temperature inside single battery 21 increases by a chemical reaction, and it happens that single batteries 21 are swollen in a thickness direction. At this time, since stacked single batteries 21 are bound in a compressed state, pressure by repulsion is applied to end plate 25, and then tensile force is applied to metal band 26. In the case where a capacity of the single battery is small, the pressure by repulsion is small, and then an elongation amount of the metal band does not matter. In accordance with increasing a capacity of the single battery recently, there is a tendency that the chemical reaction easily happens inside the single battery. Therefore, deformation of the end plate or the metal band becomes large, and then an outer size of the assembled battery is changed.

Embodiments of the present invention will be explained below, referring to the figures.

(Embodiment 1)

Figure 1:
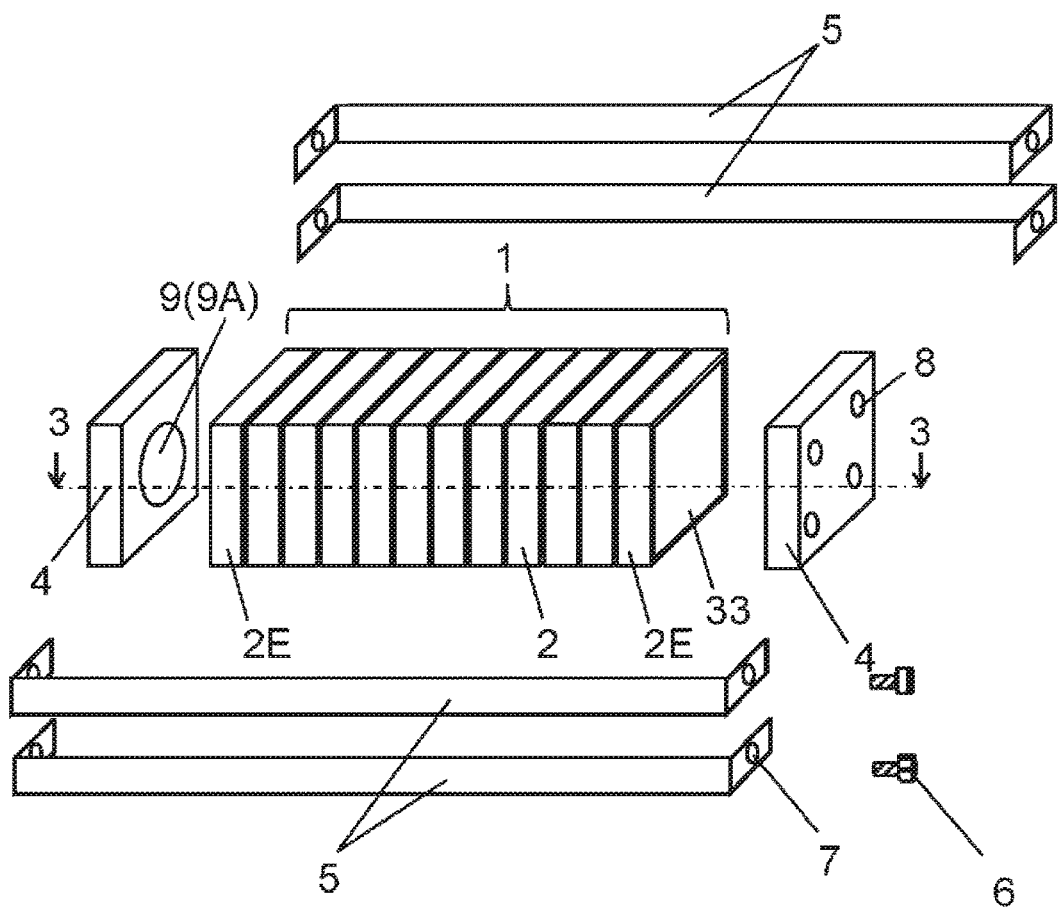
FIG. 1 is a main configuration view of an assembled battery relating to an embodiment 1 of the present invention.

FIG. 1 is a main configuration view of an assembled battery relating to an embodiment 1 of the present invention. Battery block 1 is configured by alternatively stacking single batteries 2 as a plurality of rectangular batteries (rectangular parallelepiped batteries or prismatic batteries) and separators 33.

In this assembled battery, both sides of battery block 1 are sandwiched and fixed between end plates 4 as fixing components made of aluminum, and bolts 6 are fixed in screw taps 8 of end plates 4 through holes 7 of metal bands 5 made of steel. Separators 33 may be made of resin.

Figure 2A:
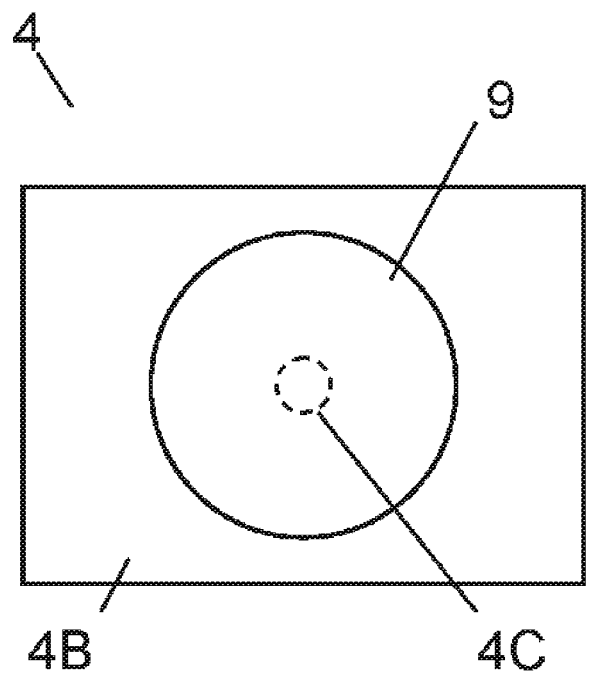
FIG. 2A is a plan view of an end plate relating to the embodiment 1 of the present invention.
Figure 2B:
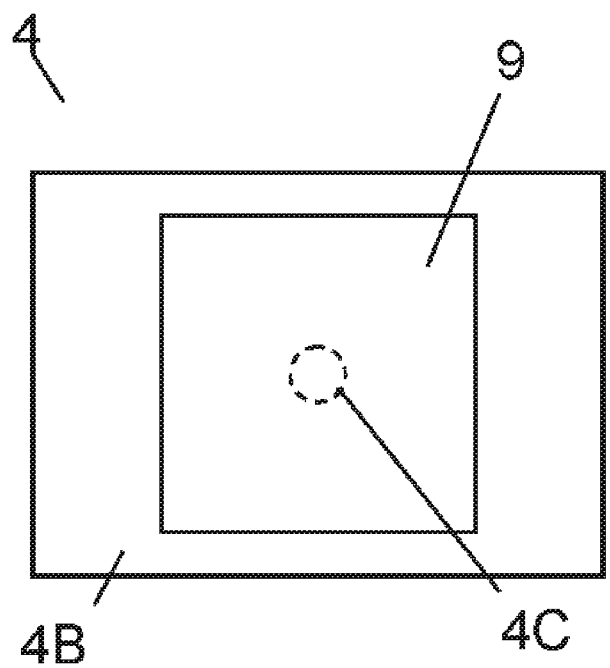
FIG. 2B is a plan view of another end plate relating to the embodiment 1 of the present invention.
Figure 2C:
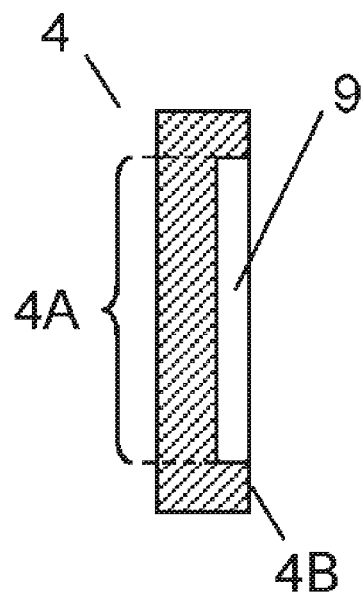
FIG. 2C is a side sectional view of the end plate shown in FIG. 2A.

FIG. 2A and FIG. 2B are front views of the end plates 4. In FIG. 2A, recess 9 has a circular shape, and in FIG. 2B, recess 9 has a rectangular shape. FIG. 2C is a side sectional view of FIG. 2A or FIG. 2B. In detail, recess 9 is formed at a central location of one surface of end plate 4, and battery block 1 is sandwiched and fixed by the surface where recess 9 are formed in end plates 4. Namely, end plate 4 has thin part 4A at the central portion. Then, preferably, thin part 4A is formed such that recess 9 is provided at a surface of end plate 4 facing single battery 2.

Figure 2D:
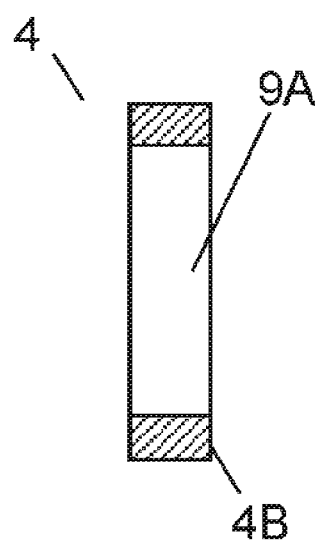
FIG. 2D is a side sectional view of the end plate shown in FIG. 2B.

Here, in FIG. 2C, as one example, recess 9 is shown, but this part is not limited to be recess 9. For example, as shown in FIG. 2D, through hole 9A may be provided at the central portion of end plate 4.

Namely, this assembled battery has battery block 1 configured by stacking the plurality of single batteries 2, and fixing components fixing the plurality of single batteries 2. The fixing components include a pair of end plates 4 disposed at both ends in a stacked direction of the plurality of single batteries 2, and metal band 5 making the plurality of single batteries 2 in a compressed state by coupling end parts of the pair of end plates 4 each other. Each of the pair of end plates 4 has peripheral part 4B and central part 4C. The pair of end plates 4 respectively contact both end single batteries 2E located at both ends in the stacked direction of the plurality of single batteries 2 at peripheral parts 4B, and are respectively separated from both end single batteries 2E at central parts 4C.

Figure 3:
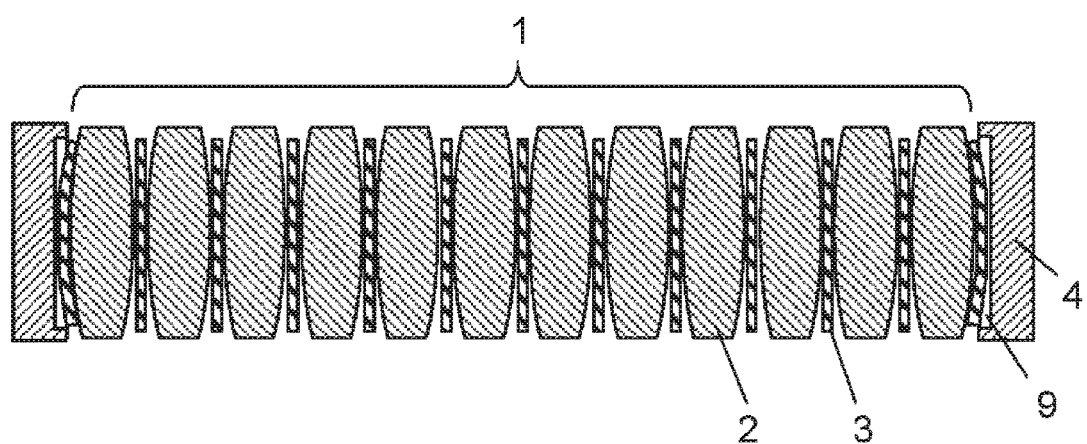
FIG. 3 is a schematic view of a state of a battery block at the time when single batteries are swollen relating to an embodiment 1 of the present invention.

FIG. 3 is a schematic view of a state of battery block 1 at the time when single batteries 2 are swollen, showing a sectional view along a line 3-3 in FIG. 1. The central portion of single battery 2 having a high capacity is swollen at the operating time, and separators 33 or central portions of single batteries 2 at both ends, enter into recesses 9 of end plates 4. Thus, the pressure which is applied to end plates 4 due to the swells at the central portions of single batteries 2, can be suppressed.

Single battery 2 is configured by being sealed in a state where band-shaped electrodes are wound in a rectangular shape. When charge and discharge are repeated as a battery operation, the inner electrodes of single battery 2 are gradually swollen. Since the electrodes are wound so as to be bent up and down, the electrodes push single battery 2 in a rectangular shape due to the swell. Therefore, as the shapes of recess 9 or through hole 9A of end plate 4, the rectangular shape shown in FIG. 2B has a high effect, but even the circular shape shown FIG. 2A has a certain degree of an effect.

Figure 4:
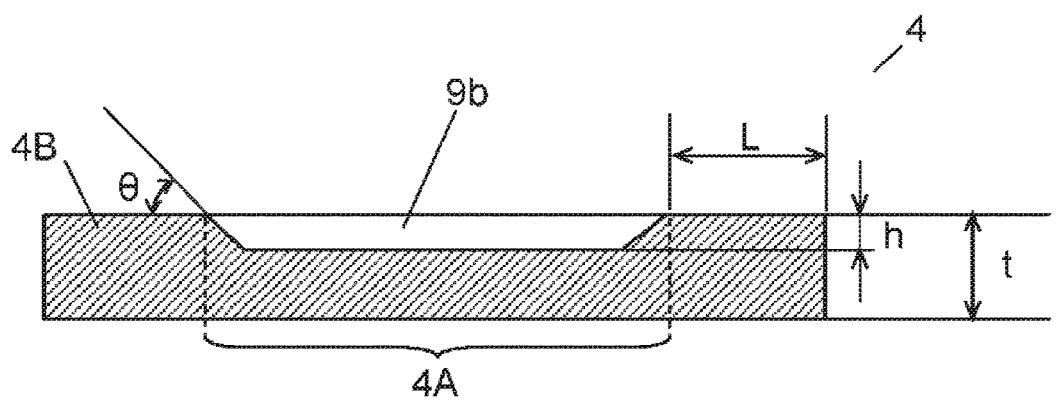
FIG. 4 is a sectional view of a portion including a recess of the end plate relating to the embodiment 1 of the present invention.

FIG. 4 is a sectional view of a portion including recess 9b of end plate 4.

The swell amount of single battery 2 is a minimum height of 0.03 mm, depending on the operating state of charge and discharge. In contrast, the bigger the depth of recess 9b is, the bigger the reducing effect of the pressure applied to end plate 4 is. When the circular or rectangular through hole 9A is provided instead of recess 9b, the pressure by the swell of single batteries 2 is not received at the central portion of end plate 4.

When a load to end plate 4 is considered, through hole 9A where the pressure is not applied to the central portion of end plate 4, is an advantageous structure. On the other hand, the hardness of end plate 4 having through hole 9A becomes small, and its deformation becomes big. Therefore, the depth of recess 9b of end plate 4 is determined in the appropriate range, considering a balance of the pressure reducing effect and the decrease of the hardness.

In order that the hardness of end plate 4 is not decreased, the depth of recess 9b is preferably 10% or less of the thickness of a portion except recess 9b. Namely, the depth (maximum depth) of recess 9b is 0.03 mm or more, and is 10% or less of the thickness t in the portion except thin part 4A of end plate 4.

It is preferable that the opening area of recess 9 is 30% or more, and 80% or less than the area where end plate 4 contacts single battery 2.

When single battery 2 is swollen, the area of a portion to which the pressure is applied in contact with end plate 4, is 30% or more, and the opening area of recess 9 also need be equal to or more than this value. In contrast, when the opening area is large, an area or a region which receives the pressure by the swell of single batteries 2, becomes small. By concentrating the load to this portion, plasticity deformation or damage of end plate 4 may occur. In order to avoid this state, it is necessary that the region of 20% or more in the area of end plate 4 receives the pressure. Namely, it is preferable that the opening area of recess 9 is 80% or more.

The minimum inclination angle at a time of the swell of single battery 2 is one or less degree, and the maximum inclination angle is ten or less degrees. Therefore, in order that the pressure is not received from peripheral part 4B of recess 9b at the time of the swell of single battery 2, when the inclination angle $\theta$ at the periphery of recess 9b is ten or more degrees, the inclination angle does not hinder the swell.

Assume that recess 9b is manufactured by mechanical working, the maximum of the inclination angle is 90 degrees from the limitation of tool shapes. Further, peripheral part 4B of end plate 4 except recess 9b, contacts single battery 2. Then, the area of peripheral part 4B having a length L, receives the pressure from battery block 1. The area has a size such that binding force of metal band 5 does not cause plasticity deformation of single battery 2. The portion which contacts battery block 1, is adjacent to metal band 5. This prevents end plate 4 from being deformed. Since the pressures generated during the operation are different depending on the capacities of single batteries 2, the minimum value of length L cannot be determined. However, it is preferable that length L is 10 or more mm.

According to the above-mentioned structure, even though the central portion of single battery 2 is swollen during the operation and the pressure is applied to end plates 4 through battery block 1, since recesses 9 of end plates 4 absorb the swell, the pressure applied to end plates 4 can be decreased.

The portion of end plate 4 which receives the pressure, is peripheral part 4B, and peripheral part 4B is adjacent to metal bands 5 as the fixing components. Thus, the high hardness portion of end plate 4 receives the pressure. As a result, the enlargement of the whole outer size of the assembled battery can be suppressed.

(Embodiment 2)

Figure 5:
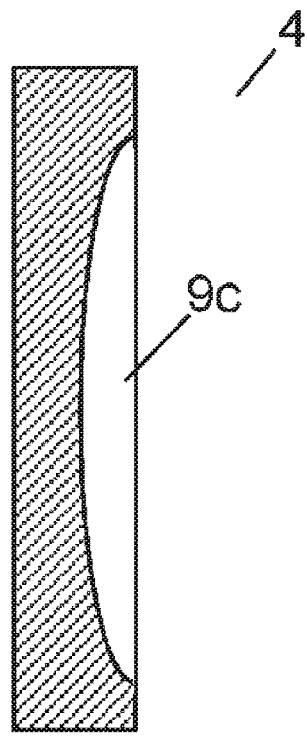
FIG. 5 is a sectional view of a portion including a recess of an end plate relating to an embodiment 2 of the present invention.

FIG. 5 is a sectional view of a portion including recess 9c of end plate 4 relating to an embodiment 2 of the present invention. In the embodiment 2, the different point from the embodiment 1 is that the shape in the depth direction of recess 9c is a curved surface.

Since the shape in the depth direction of recess 9c of end plate 4 is the curved surface, even when the vicinity of the center in single battery 2 is swollen and contacts recess 9c of end plate 4, the pressure load at the central portion of the outer case of single battery 2 becomes equalized. Therefore, the central portion of the outer case can be prevented from being damaged.

(Embodiment 3)

Figure 6A:
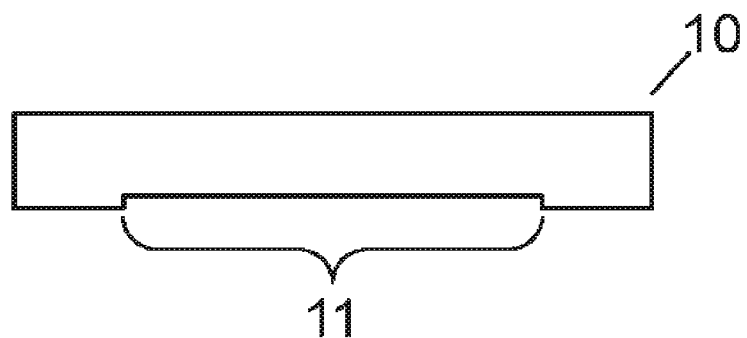
FIG. 6A is a plan view of an end plate relating to an embodiment 3 of the present invention.
Figure 6B:
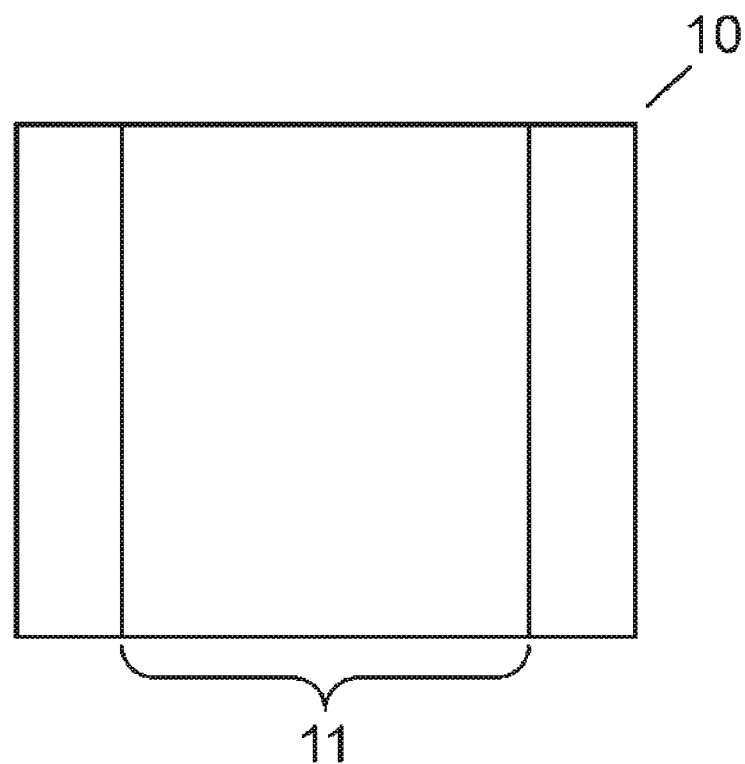
FIG. 6B is a front view of the end plate relating to the embodiment 3 of the present invention.

FIG. 6A is a plan view of end plate 10 in an assembled battery relating to an embodiment 3 of the present invention, and FIG. 6B is a front view of end plate 10. In the embodiment 3, the different point from the embodiment 1 is that recess 11 penetrates end plate 10 in the vertical direction and the thick portions in the plate thickness are adjacent to and fixed by metal bands 5. As shown in FIG. 2A, FIG. 2B, when contacting potions remain at four sides in peripheral part 4B of end plate 4, practically recess 9 is formed by mechanical working.

In contrast, as shown in FIG. 6A, FIG. 6B, in the case where recess 11 penetrates in the one direction, for example, a component made of aluminum can be used as extruded material. Thus, the productivity is high, the components are inexpensive.

Here, due to the pressure generated by the swell of single battery 2, the load stress becomes maximized at the adjacent or fixing portions of end plates 10 and metal bands 5. Therefore, the plate thicknesses of those portions of end plate 10 is made thick, and then the hardness is made high, and the deformation can be minimalized.

(Embodiment 4)

Figure 7A:
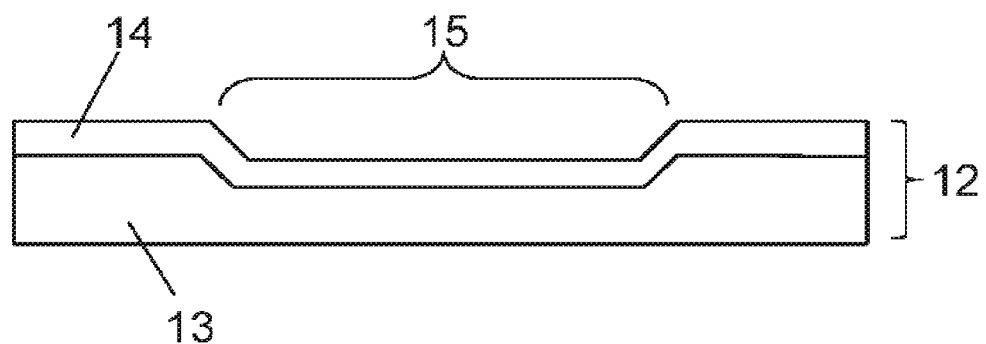
FIG. 7A is a plan view of an end plate relating to an embodiment 4 of the present invention.
Figure 7B:
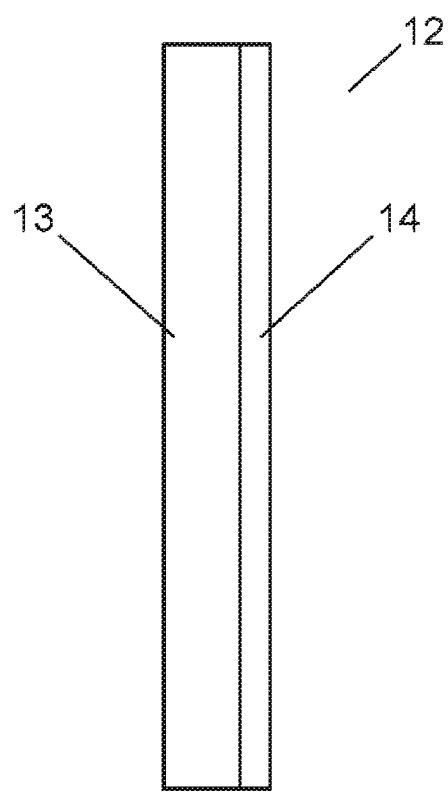
FIG. 7B is a side view of an end plate relating to the embodiment 4 of the present invention.

FIG. 7A is a plan view of end plate 12 relating to an embodiment 4 of the present invention, and FIG. 7B is a side view of end plate 12. In the embodiment 4, the different point from the embodiments 1 to 3 is that end plate 12 is configured of two components of end plate 13 made of aluminum and end plate 14 made of steel. End plate 13 and end plate 14 may be jointed, or coupled by a screw.

End plate 14 made of steel is arranged at the side facing battery block 1. Since single battery 2 as a swelling source is near, this arrangement enhances the hardness. When the outer shapes are the same and end plate 14 made of steel having a higher hardness than that of aluminum is used, the hardness is enhanced, but the weight becomes heavy. However, since recess 15 is provided, the weight is reduced by eliminating a material corresponding to recess 15.

Here, materials of end plates 13, 14 are not limited to aluminum and steel. End plate 12 is configured of two kinds of different materials, and one of the different materials has a higher hardness than that of another of the different materials, and the one of the different materials is disposed at a side contacting battery block 1.

INDUSTRIAL APPLICABILITY

The assembled battery of the present invention can be used as uses of the assembled batteries of cylindrical or pouch batteries besides rectangular batteries.

REFERENCE MARKS IN THE DRAWINGS 1, 23: battery block
2, 21: single battery
2E: both end single battery
4, 10, 12. 13, 14, 25: end plate
4A: thin part
4B: peripheral part
4C: central part
5, 26: metal band
6: bolt
7: hole
8: tap
9, 9b, 9c, 11, 15: recess
9A: through hole
33: separator

The invention claimed is:

1. An assembled battery comprising:
a battery block configured by stacking a plurality of single batteries; and
fixing components fixing the plurality of the single batteries,
wherein the fixing components include a pair of end plates disposed at both ends in a stacked direction of the plurality of the single batteries and in an elongated direction of the battery block, and a metal band configured to compress the plurality of the single batteries by coupling end parts of the pair of the end plates to each other,
each of the pair of the end plates has a peripheral part and a central part, and
the pair of the end plates respectively contact both end single batteries located at both ends in the stacked direction at the peripheral parts, and are respectively separated from both end single batteries at the central parts,
wherein one of the end plates is configured of at least two kinds of different metal materials, and one of the at least two kinds of different materials having a higher hardness is disposed at an inner side contacting the battery block,
wherein the at least two kinds of different metal materials are steel and aluminum, and the one of the at least two kinds of different metal materials having a higher hardness is steel,
wherein the steel has a recess at the central part, the aluminum has a recess at the central part corresponding to the recess of the steel and a plate surface at an outer side.

2. The assembled battery according to claim 1, wherein in one of the end plates, a through hole is provided at the central part.

3. The assembled battery according to claim 1, wherein in one of the end plates, a part is provided at the central part.

4. The assembled battery according to claim 3, wherein in the one of the end plates, the part is formed such that the recess is provided on a surface of the one of the end plates facing the plurality of the single batteries.

5. The assembled battery according to claim 4, wherein a maximum depth of the recess is 0.03 mm or more, and is 10% or less of a thickness in a portion other than the recess.

6. The assembled battery according to claim 1, wherein a portion of one of the end plates contacting the battery block, is adjacent to the metal band.

7. The assembled battery according to claim 1, wherein a recess is provided at a central part of one of the end plates facing the plurality of the single batteries, wherein an inclination angle of a periphery of the recess is greater than 10 degrees to not hinder swell of one or more of the single batteries.

8. The assembled battery according to claim 7, wherein the inclination angle of a periphery of the recess is less than or equal to 90 degrees.

* * * * *